US008639970B2

(12) United States Patent
Batwara

(10) Patent No.: US 8,639,970 B2
(45) Date of Patent: Jan. 28, 2014

(54) ISOLATING AND CORRECTING VPD DATA MISMATCH AND/OR CORRUPTION

(75) Inventor: Ashish Batwara, Wichita, KS (US)

(73) Assignee: LSI Corporation, San Jose, CA (US)

( * ) Notice: Subject to any disclaimer, the term of this patent is extended or adjusted under 35 U.S.C. 154(b) by 284 days.

(21) Appl. No.: 13/093,274

(22) Filed: Apr. 25, 2011

(65) Prior Publication Data
US 2012/0272096 A1 Oct. 25, 2012

(51) Int. Cl.
*G06F 11/00* (2006.01)

(52) U.S. Cl.
USPC .......................................................... 714/6.2

(58) Field of Classification Search
USPC .......................................................... 714/6.2
See application file for complete search history.

(56) References Cited

U.S. PATENT DOCUMENTS

| 5,245,615 | A * | 9/1993 | Treu ................................ 714/45 |
| 6,564,348 | B1 * | 5/2003 | Barenys et al. ................ 714/732 |
| 6,892,316 | B2 * | 5/2005 | Eide et al. ........................ 714/3 |
| 7,484,116 | B2 * | 1/2009 | Brey et al. ...................... 714/6.1 |
| 7,568,123 | B2 * | 7/2009 | Goodman et al. ............. 714/6.3 |
| 7,590,883 | B2 * | 9/2009 | Engle et al. ................... 714/6.32 |
| 7,752,485 | B2 * | 7/2010 | Bavaria et al. .................... 714/2 |
| 7,979,783 | B2 * | 7/2011 | Goessel et al. ................ 714/799 |
| 8,261,050 | B2 * | 9/2012 | Bavaria et al. .................... 713/1 |
| 8,276,032 | B2 * | 9/2012 | Henry et al. ................... 714/732 |
| 8,365,030 | B1 * | 1/2013 | Choi et al. ..................... 714/746 |
| 2002/0145916 | A1 * | 10/2002 | Chevallier ................ 365/185.33 |
| 2004/0215569 | A1 * | 10/2004 | Agha et al. ....................... 705/57 |
| 2009/0282416 | A1 * | 11/2009 | Bavaria et al. ................. 718/104 |

OTHER PUBLICATIONS

Storage Bridge Bay (SBB) Specification, Version 2.0, Storage Bridge Bay Working Group, Inc., Jan. 28, 2008.

* cited by examiner

*Primary Examiner* — Amine Riad
(74) *Attorney, Agent, or Firm* — Alexander J. Neudeck; Cochran Freund & Young LLC

(57) ABSTRACT

Disclosed is a method of detecting a product data error in a storage system. First and second vital product data (VPD) EEPROMs are read. Indicators of whether wither or both reads failed are received. Based on these indicators, the contents of the VPD EEPROMs may be compared. Based on a result of the comparing indicating a match, an arbitrary one of the VPD EEPROMS is used. Based on an indicator indicating an error with the first VPD EEPROM, the second VPD EEPROM is used.

14 Claims, 5 Drawing Sheets

ISOLATING AND CORRECTING VPD DATA MISMATCH AND/OR CORRUPTION

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that may provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Multiple disk storage systems typically utilize a controller that shields the user or host system from the details of managing the storage array. The controller may make the storage array appear as one or more disk drives (or volumes). This is accomplished in spite of the fact that the data (or redundant data) for a particular volume may be spread across multiple disk drives.

To facilitate the development and deployment of these multiple disk storage systems, several specifications have been developed. Few of these specifications are promulgated by the Storage Bridge Bay Working Group, Inc. In particular, the Storage Bridge Bay Working Group, Inc. has promulgated the Storage Bridge Bay (SBB) Specification, Version 2.0, Jan. 28, 2008 available at www.sbbwg.org. This specification aims to define common mechanical, electrical, and internal interfaces between a storage enclosure and the electronics cards that give the system a function. The ultimate aim of the SBB specification is to allow multiple different controllers to be used in a single, standard compliant, chassis to change the "personality" of the storage array.

SUMMARY OF THE INVENTION

An embodiment of the invention may therefore comprise a method of detecting a product data error in a storage system, comprising: reading at least a first portion of a first vital product data (VPD) EEPROM; reading at least a second portion of a second VPD EEPROM that corresponds to said first portion of said first VPD EEPROM; receiving a first indicator of whether said reading said at least said first portion failed; receiving a second indicator of whether said reading said at least said second portion failed; based on said first indicator and said second indicator, comparing said at least said first portion and said at least said second portion; based on a result of said comparing indicating a match, using data from said at least said first portion; based on said first indicator indicating an error with said first reading, using data from said at least said second portion.

An embodiment of the invention may therefore further comprise a method of detecting a bus malfunction in a storage system, comprising: using a first controller, reading at least a first portion of a first vital product data (VPD) EEPROM; using said first controller, reading at least a second portion of a second VPD EEPROM that corresponds to said first portion of said first VPD EEPROM; receiving a first indicator of whether said reading said at least said first portion failed; receiving a second indicator of whether said reading said at least said second portion failed; using a second controller, reading at least a third portion of said first VPD EEPROM; using said second controller, reading at least a fourth portion of said second VPD EEPROM that corresponds to said third portion of said first VPD EEPROM; receiving a third indicator of whether said reading said at least said third portion failed; and, receiving a fourth indicator of whether said reading said at least said fourth portion failed.

DETAILED DESCRIPTION OF THE EMBODIMENTS

Figure 1:
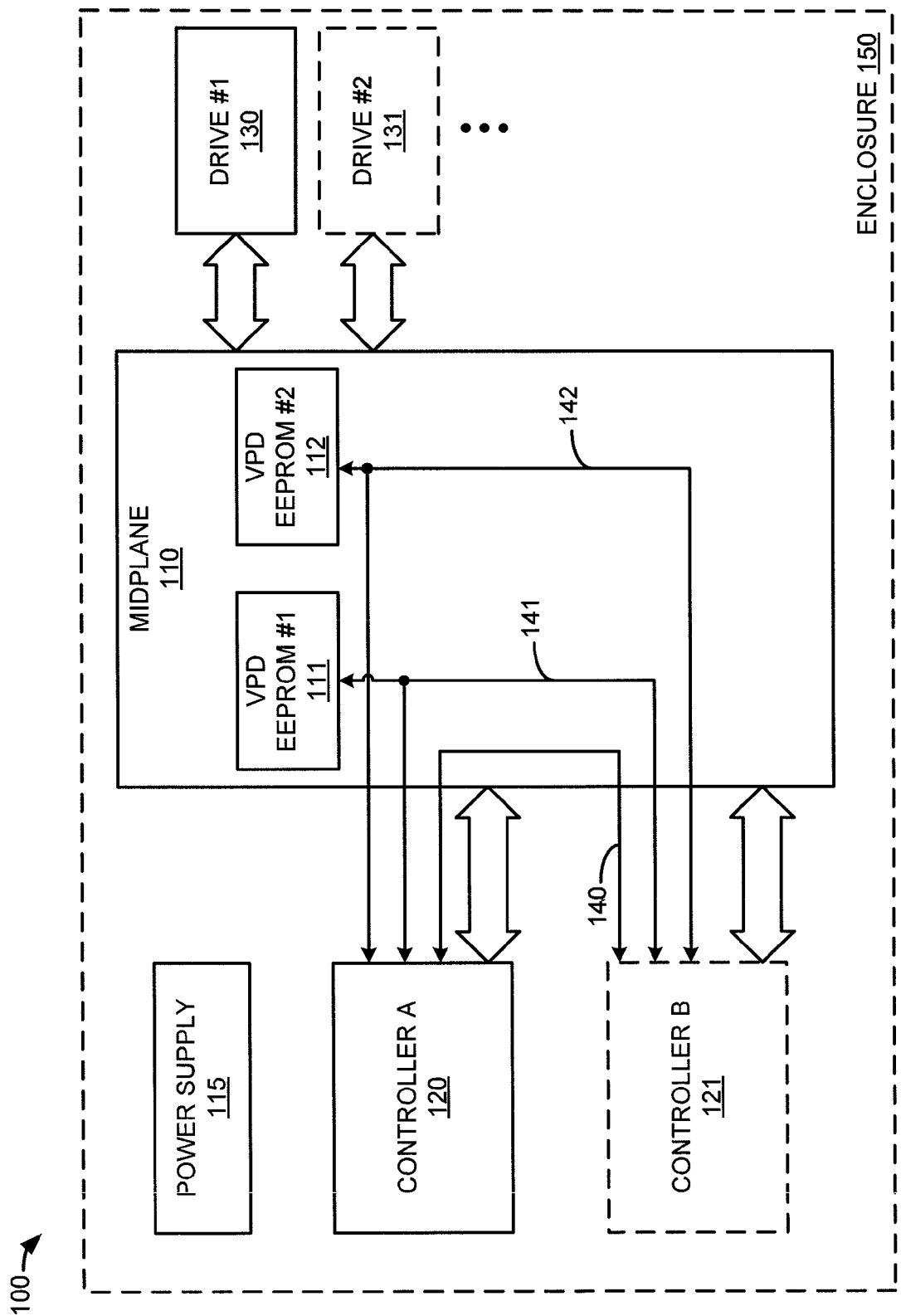
FIG. 1 is a block diagram illustrating a storage system.

FIG. 1 is a block diagram illustrating a storage system. In FIG. 1, storage system 100 comprises: midplane 110, power supply 115, controller A 120, controller B 121, storage device 130, storage device 131, and enclosure 150. Controller A 120 and optional controller B 121 (if present) are operatively coupled to midplane 110. Storage device 130 and optional storage device 131 (if present) are operatively coupled to midplane 110. Thus, controllers 120-121 may operatively connect or exchange information with storage devices 130-131 via midplane 110. Controllers 120-121 may operatively connect with, or exchange that information with, other devices (not shown) that are coupled to storage system 100. Storage system 100 may comprise additional controllers. Storage system 100 may comprise additional storage devices. However, these have been omitted from FIG. 1 for the sake of brevity.

Storage system 100 may be, or comprise, a system that conforms to the SBB specification. Thus, controllers 120-121 may be, or comprise, controllers that are compatible with or described by, for example, InfiniBand, Just a Bunch Of Disks or Just a Box Of Drives (JBOD), Redundant Array of Inexpensive Disks (RAID), Network Attached Storage (NAS), Storage Array Network (SAN), iSCSI SAN, or a Virtual Tape Library (VTL). Thus, storage devices 130-131 may be, or comprise, hard disk drives. Storage devices 130-131 may be, or comprise, other types of drives such as solid state disk drives, tape drives, and ROM drives. Other types of storage devices are possible.

Midplane 110 includes Two Wire Interface (TWI) #0 140, TWI #1 141, and TWI #2 142. TWI #0 operatively couples controller A 120 to controller B 121 (if present). TWI #1 operatively couples controller A 120, controller B 121 (if present), to Vital Product Data (VPD) EEPROM #1 111. TWI #2 operatively couples controller A 120, controller B 121 (if present), to VPD EEPROM #2 112. Functions and specifications for at least midplane 110, controllers 120-121, VPD EEPROM #1 111, VPD EEPROM #2 112, TWI #0 140, TWI #1 141, and TWI #2 142 are given in Storage Bridge Bay (SBB) Specification, Version 2.0, Jan. 28, 2008 available at www.sbbwg.org.

In an embodiment, controller A 120 and controller B 121 (if present) read VPD EEPROM #1 111 and VPD EEPROM #2 112 when storage system 100 is initializing. If any of these reads fails, the controller 120-121 detecting the read failure marks the appropriate VPD EEPROM 111-112 as suspect. If the reads are successful, controllers 120-121 compare the contents of VPD EEPROM #1 111 and VPD EEPROM #2 112 to determine if they are the same. If the contents of VPD EEPROM #1 111 and VPD EEPROM #2 112 are the same, controller A 120 and controller B 121 (if present) uses the contents of VPD EEPROM #1 111. If either the contents of VPD EEPROM #1 111 and VPD EEPROM #2 112 are not the same, or at least one of the reads were are not successful, further isolation and correction is performed. The process for further isolation and correction depends on whether controller B 121 is present.

In an embodiment, when controller B 121 is not present, controller A 120 locks itself down (e.g., halts or stops read/writes) if the reads from both VPD EEPROM #1 111 and VPD EEPROM #2 112 failed. Controller A 120 may report that either controller A 120 is faulty, or that both TWI #1 141 and TWI #2 142 are faulty. In the case where only one of the reads from VPD EEPROM #1 111 and VPD EEPROM #2 112 failed, controller A 120 uses the VPD EEPROM 111-112 not associated with the failed read.

In a case where the reads from both VPD EEPROM #1 111 and VPD EEPROM #2 112 succeeded, but the contents of VPD EEPROM #1 111 and VPD EEPROM #2 112 mismatch, controller A performs a checksum verification of VPD EEPROM #1 111 and VPD EEPROM #2 112. If these checksum verifications both pass, controller A 120 uses the write-counter defined for VPD EEPROM #1 111 and VPD EEPROM #2 112 to select a VPD EEPROM 111-112. The selection of the VPD EEPROM 111-112 may be based on which VPD EEPROM 111-112 has a higher write-count value (and thus, is the more recently written VPD EEPROM 111-112). The selected VPD EEPROM 111-112 may then be used to rewrite the contents of the non-selected VPD EEPROM 111-112. In the case that the write-counter values for VPD EEPROM #1 111 and VPD EEPROM #2 are equal, controller A 120 may use an arbitrarily selected VPD EEPROM 111-112 (e.g., VPD EEPROM #1 111).

If the checksum verifications fail on one VPD EEPROM 111-112, but pass on the other, controller A 120 may rewrite the contents of the VPD EEPROM 111-112 that failed checksum verification with the contents of the VPD EEPROM 111-112 that passed the checksum verification. If a rewrite of a VPD EEPROM 111-112 fails, then controller A 120 uses the VPD EEPROM 111-112 that passed the checksum verification. If the checksum verifications fail on both VPD EEPROMs 111-112, controller A 120 locks down.

In an embodiment, when controller B 121 is present, controllers 120-121 read the status of the reads that the other controller 120-121 performed. In a case where the reads from both VPD EEPROM #1 111 and VPD EEPROM #2 112 failed for both controllers 120-121, both controllers 120-121 lock down. Storage system 100 may report that both TWI #1 141 and TWI #2 142 are faulty.

In a case where the reads from both VPD EEPROM #1 111 and VPD EEPROM #2 112 failed for one controller 120-121, but passed for the other controller, the controller 120-121 with the failing reads locks down. This condition indicates that the controller 120-121 with the failing reads is faulty. In a case where the read from VPD EEPROM #1 111 failed for both controllers 120-121, and the read from VPD EEPROM #2 112 succeeded for both controllers 120-121, both controllers 120-121 use VPD EEPROM #2 112. This condition indicates that TWI #1 141 is faulty.

In a case where the read from VPD EEPROM #1 111 failed for one controller 120-121, but succeeded for the other controller 120-121, the controller 120-121 with the failed read uses VPD EEPROM #2 112. This condition indicates that the controller 120-121 with the failed read is faulty.

In a case where the read from VPD EEPROM #2 112 failed for one controller 120-121, but succeeded for the other controller 120-121, the controller 120-121 with the failed read uses VPD EEPROM #1 111. This condition indicates that the controller 120-121 with the failed read is faulty.

In a case where the read from VPD EEPROM #2 112 failed for both controllers 120-121, both controllers 120-121 use VPD EEPROM #1 111. This condition indicates that TWI #2 142 is faulty.

In a case where the reads from both VPD EEPROM #1 111 and VPD EEPROM #2 112 succeeded for both controllers 120-121, but the contents of VPD EEPROM #1 111 and VPD EEPROM #2 112 are detected to mismatch by at least one controller 120-121, controllers 120-121 perform a checksum verifications of VPD EEPROM #1 111 and VPD EEPROM #2 112. If these checksum verifications both pass, controllers 120-121 use the write-counter defined for VPD EEPROM #1 111 and VPD EEPROM #2 112 to select a VPD EEPROM 111-112. The selection of the VPD EEPROM 111-112 may be based on which VPD EEPROM 111-112 has a higher write-count value (and thus, is the more recently written VPD EEPROM 111-112). The selected VPD EEPROM 111-112 may then be used to rewrite the contents of the non-selected VPD EEPROM 111-112. In the case that the write-counter values for VPD EEPROM #1 111 and VPD EEPROM #2 112 are equal, controllers 120-121 may use an arbitrarily selected VPD EEPROM 111-112 (e.g., VPD EEPROM #1 111).

In the case where a checksum verification performed by one of controllers 120-121 fails on one of the VPD EEPROMs 111-112, and this failure is also detected by the other controller 120-121, the contents of the VPD EEPROM 111-112 that did not pass are rewritten from the non-corrupted VPD EEPROM 111-112. In the case where there is a write failure during the rewrite of the corrupted VPD EEPROM 111-112, or checksum verification failure is not also detected by the other controller 120-121, controllers 120-121 use the non-corrupted VPD EEPROM 111-112. If checksum verification fails for both VPD EEPROM #1 111 and VPD EEPROM #2, the controller 120-121 (or both) detecting the failure of both VPD EEPROM #1 111 and VPD EEPROM #2 locks down.

Figure 2:
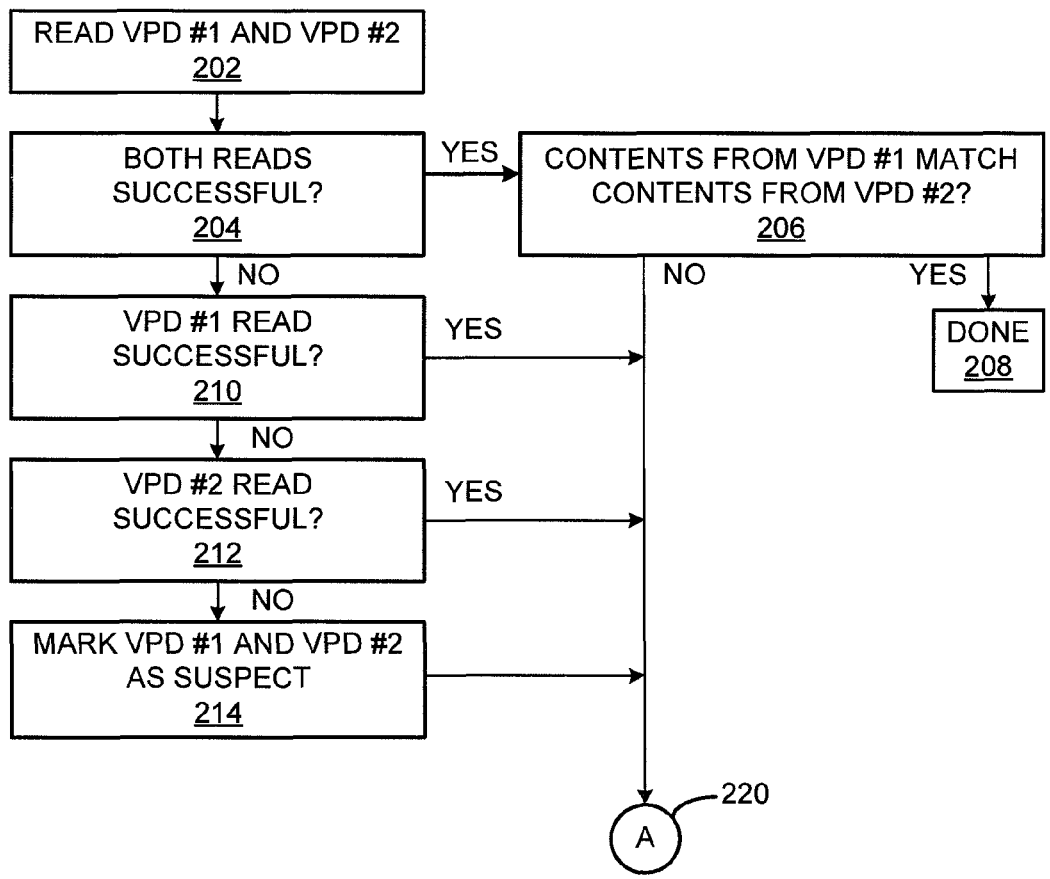
FIG. 2 is a flowchart illustrating a method of detecting an error.

FIG. 2 is a flowchart illustrating a method of detecting an error. The steps illustrated in FIG. 2 may be performed by one or more elements of storage system 100. VPD EEPROM #1 111 and VPD EEPROM #2 (hereinafter VPD #1 and VPD #2, for brevity) are read. For example, controller A 120 (or controller B 121, if preset) may read VPD #1 and VPD #2 (202). In box 204, it is determined if both reads were successful (204). If both reads were successful, flow proceeds to box 206. If both reads were not successful, flow proceeds to box 210. If both reads were successful, it is determined if the contents from VPD #1 match the contents from VPD #2 (206). If the contents of VPD #1 match the contents of VPD #2, flow ends in box 208. If both reads were not successful, flow proceeds to another figure via reference label A 220.

If both reads were not successful as determined in box 204, flow proceeds to box 210. In box 210, it is determined if the read of VPD #1 was successful (210). If the read of VPD #1 was successful, flow proceeds to another figure via reference label A 220. If the read of VPD #1 was not successful, flow proceeds to box 212. In box 212, it is determined if the read of VPD #2 was successful (212). If the read of VPD #2 was successful, flow proceeds to another figure via reference label A 220. If the read of VPD #2 was not successful, flow proceeds to box 214. In box 214, both VPD #1 and VPD #2 are marked as suspect (214). Flow then proceeds to another figure via reference label A 220.

Figure 3:
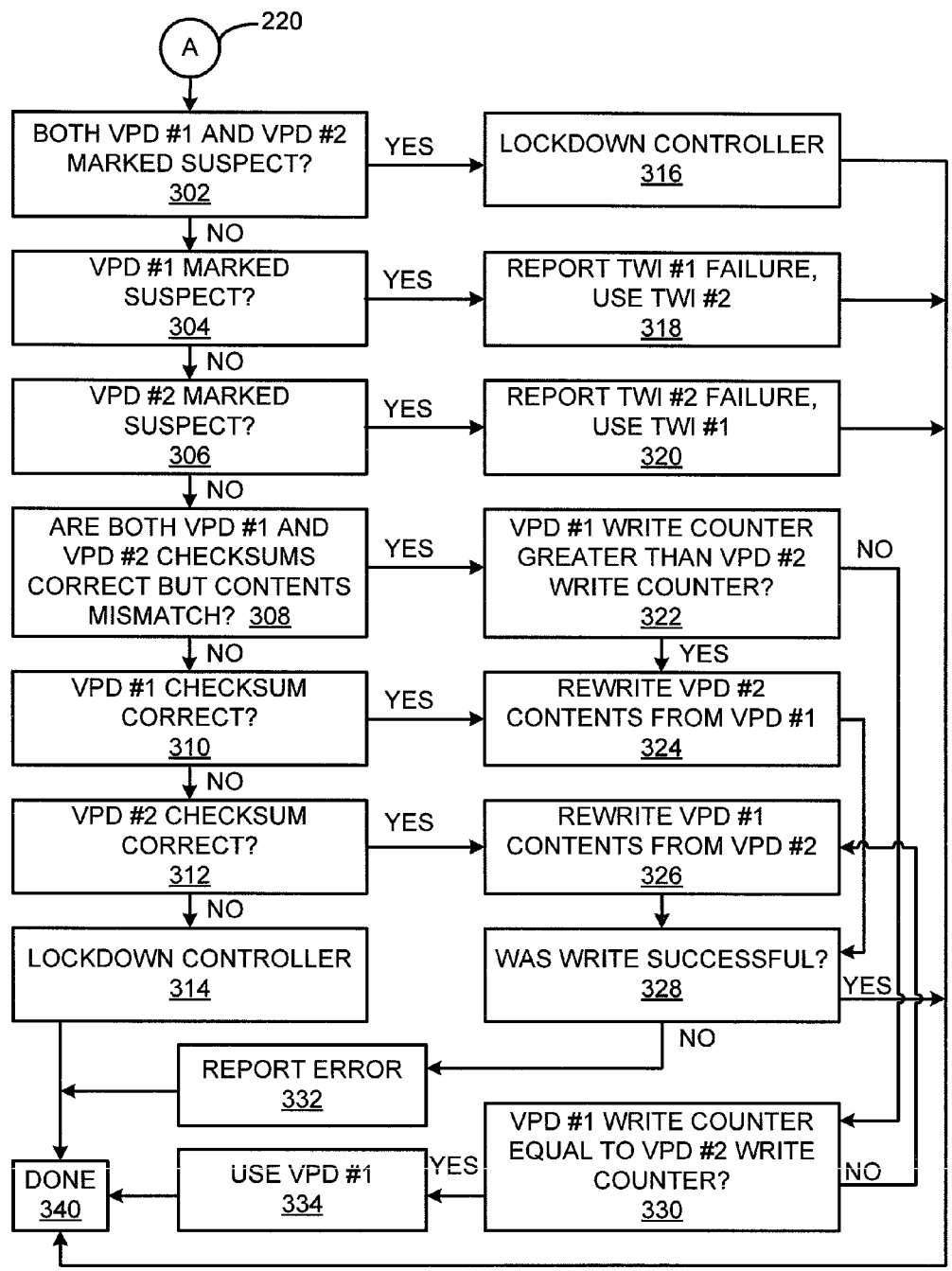
FIG. 3 is a flowchart illustrating a method of isolating and correcting an error.

FIG. 3 is a flowchart illustrating a method of isolating and correcting an error. The steps illustrated in FIG. 3 may be performed by one or more elements of storage system 100. The steps illustrated in FIG. 3 are typically performed when controller 121 is not present (i.e., there is not a redundant controller present in storage system 100).

In FIG. 3, flow begins via reference label A 220 and proceeds to box 302. In box 302, it is determined whether both VPD #1 and VPD #2 are marked as suspect. If both VPD #1 and VPD #2 are marked as suspect, flow proceeds to box 316. If both VPD #1 and VPD #2 are not marked as suspect, flow proceeds to box 304. In box 316, the controller is locked down (316). Flow then ends in box 340.

If both VPD #1 and VPD #2 are not marked as suspect, it is determined whether VPD #1 (alone) is marked suspect (304). If VPD #1 (alone) is marked suspect, flow proceeds to box 318. If VPD #1 is not marked suspect, flow proceeds to box 306. If VPD #1 (alone) is marked suspect, TWI #1 is reported as failed and TWI #2 is used. It is determined whether VPD #2 (alone) is marked suspect (306). If VPD #2 (alone) is marked suspect, flow proceeds to box 320. If VPD #2 is not marked suspect, flow proceeds to box 308. If VPD #2 (alone) is marked suspect, TWI #2 is reported as failed and TWI #1 is used. It should be understood that at this stage it is clear that VPD #1 and VPD #2 can both be read, but their contents mismatch.

It is determined whether both VPD #1 and VPD #2 checksums are correct but their contents mismatch (308). If both VPD #1 and VPD #2 checksums are correct, flow proceeds to box 322. If both VPD #1 and VPD #2 checksums are not correct, flow proceeds to box 310. In box 310, it is determined if the checksum for VPD #1 is correct (310). If the checksum for VPD #1 is correct, flow proceeds to box 324. If the checksum for VPD #1 is not correct, flow proceeds to box 312. In box 312, it is determined if the checksum for VPD #2 is correct (312). If the checksum for VPD #2 is correct, flow proceeds to box 326. If the checksum for VPD #2 is not correct, flow proceeds to box 314. In box 314, the controller is locked down (314). Flow then ends in box 340.

If both VPD #1 and VPD #2 checksums are determined to be correct in box 308, it is determined whether the write-counter for VPD #1 is greater than the write counter for VPD #2 (322). If the write-counter for VPD #1 is greater than the write counter for VPD #2, flow proceeds to box 324. If the write-counter for VPD #1 is not greater than the write counter for VPD #2, flow proceeds to box 330. In box 324, VPD #2 is rewritten from VPD #1. Flow then proceeds to box 328. In box 328, it is determined whether the rewrite was successful (328). If the rewrite was successful, flow ends in box 340. If the write was not successful, and error is reported in box 332 and then flow ends in box 340.

If the write-counter for VPD #1 is not greater than the write counter for VPD #2 in box 322, it is determined whether the write counter for VPD #1 is equal to the write counter for VPD #2 (330). If the write counter for VPD #1 is equal to the write counter for VPD #2, flow proceeds to box 334. If the write counter for VPD #1 is not equal to the write counter for VPD #2 flow proceeds to box 326. In box 326, VPD #1 is rewritten from VPD #2. In box 334, the controller uses VPD #1 (334). Flow then ends in box 340.

Figure 4:
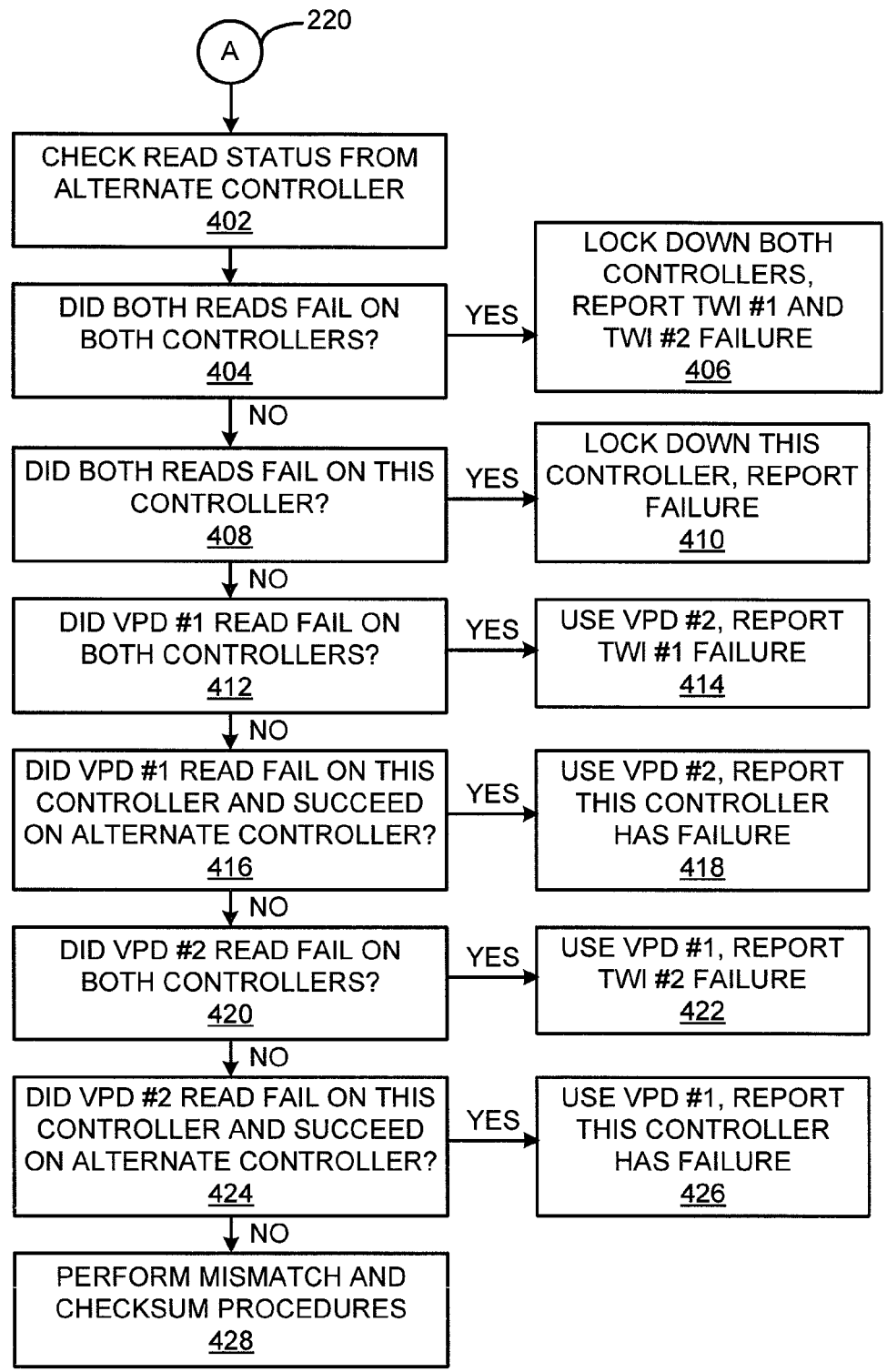
FIG. 4 is a flowchart illustrating a method of isolating and correcting an error.

FIG. 4 is a flowchart illustrating a method of isolating and correcting an error. The steps illustrated in FIG. 4 may be performed by one or more elements of storage system 100. The steps illustrated in FIG. 4 are typically performed when controller 121 is present (i.e., there is a redundant controller present in storage system 100).

In FIG. 4, flow begins via reference label A 220 and proceeds to box 402. In box 402, the read status from the alternate controller is checked (402). For example, controller A 120 may check the read status from controller B 121. It is determined if both reads failed on both controllers (404) (i.e., the reads of VPD #1 and VPD #2 failed on both controller A 120 and controller B 121), flow proceeds to box 406 where both controllers are locked down and a failure of both TWI #1 and TWI #2 is reported.

If both reads did not fail on both controllers, it is determined if both reads failed on this controller (408). I.e., controller A 120 determines if the reads of both VPD #1 and VPD #2 failed for controller A 120. Controller B performs a similar action. If both reads failed on this controller, flow proceeds to box 410 where this controller is locked down and reported as failing.

If both reads did not fail on this controller, it is determined whether the reads of VPD #1 failed on both controllers (412). If the reads of VPD #1 failed on both controllers, VPD #2 is used and TWI #1 is reported as failing (414).

If the reads of VPD #1 did not fail on both controllers, it is determined if the read of VPD #1 failed on this controller, but succeeded on the alternate controller (416). If the read of VPD #1 failed on this controller, but succeeded on the alternate controller, VPD #2 is used on this controller and it is reported that this controller has a failure (418).

If the read of VPD #2 failed on this controller and on the alternate controller (420), VPD #1 is used and a failure of TWI #2 is reported (422).

If the read of VPD #2 did not fail on both controllers, it is determined whether the read of VPD #2 failed on this controller, but succeeded on the alternate controller (424). If the read of VPD #2 failed on this controller, but succeeded on the alternate controller, VPD #1 is used, and a failure of this controller is reported (426). If the read of VPD #2 did not fail on this controller and succeed on the alternate controller, the mismatch, checksum check, and rewrite procedure (described previously) is performed (428).

The systems, engines, databases, processors, modules, and functions described above may be implemented with or executed by one or more computer systems. The methods described above may also be stored on a computer readable medium. Many of the elements of storage system 100 may be, comprise, or include computers systems. This includes, but is not limited to, controller 120, controller 121, and midplane 110.

Figure 5:
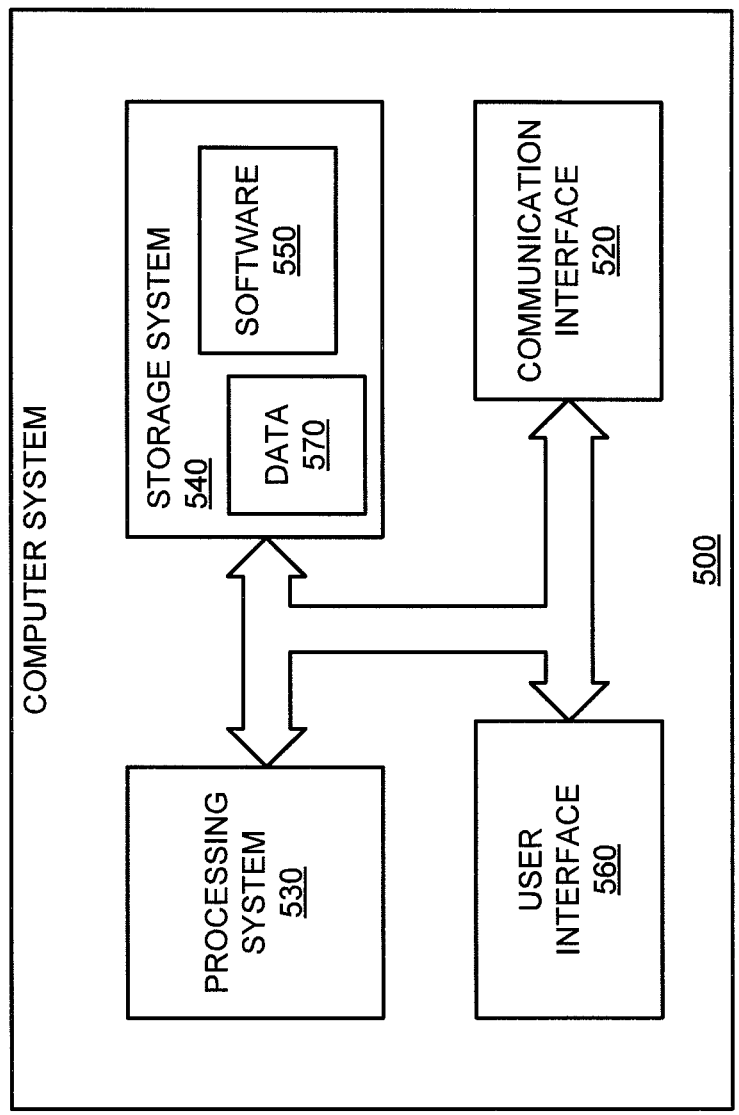
FIG. 5 is a block diagram of a computer system.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system may retrieve and store data 570. Processing system may also retrieve and store data via communication interface 520. Processing system 550 may create or modify software 550 or data 570 to achieve a tangible result. Processing system may control communication interface 520 or user interface 570 to achieve a tangible result. Processing system may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting a product data error in a storage system, comprising:
   reading at least a first portion of a first vital product data (VPD) EEPROM;
   reading at least a second portion of a second VPD EEPROM that corresponds to said first portion of said first VPD EEPROM;
   receiving a first indicator of whether said reading said at least said first portion failed;
   receiving a second indicator of whether said reading said at least said second portion failed;
   based on said first indicator and said second indicator, comparing said at least said first portion and said at least said second portion;
   based on a result of said comparing indicating a match, using data from said at least said first portion;
   based on said first indicator indicating an error with said first reading, using data from said at least said second portion; and,
   based on said result of said comparing indicating a mismatch, determining that a first checksum associated with said at least said first portion is correct and determining that a second checksum associated with said at least said second portion is correct.

2. The method of claim 1, further comprising:
   based on determining said first checksum and said second checksum are correct, determining that a first write counter associated with said first VPD EEPROM indicates said first VPD EEPROM holds more recent data than said second VPD EEPROM.

3. The method of claim 2, further comprising:
   based on determining said first write counter associated with said first VPD EEPROM indicates said first VPD EEPROM holds more recent data than said second VPD EEPROM, copying said first VPD EEPROM to said second VPD EEPROM.

4. A method of detecting a product data error in a storage system, comprising:
   reading at least a first portion of a first vital product data (VPD) EEPROM;
   reading at least a second portion of a second VPD EEPROM that corresponds to said first portion of said first VPD EEPROM;
   receiving a first indicator of whether said reading said at least said first portion failed;
   receiving a second indicator of whether said reading said at least said second portion failed;
   based on said first indicator and said second indicator, comparing said at least said first portion and said at least said second portion;
   based on a result of said comparing indicating a match, using data from said at least said first portion;
   based on said first indicator indicating an error with said first reading, using data from said at least said second portion; and,
   based on said first indicator indicating that said first reading failed and said second indicator indicating that said second reading failed, initiating a lockdown of said storage system.

5. A method of detecting a product data error in a storage system, comprising:
   reading at least a first portion of a first vital product data (VPD) EEPROM;
   reading at least a second portion of a second VPD EEPROM that corresponds to said first portion of said first VPD EEPROM;
   receiving a first indicator of whether said reading said at least said first portion failed;
   receiving a second indicator of whether said reading said at least said second portion failed;
   based on said first indicator and said second indicator, comparing said at least said first portion and said at least said second portion;
   based on a result of said comparing indicating a match, using data from said at least said first portion;
   based on said first indicator indicating an error with said first reading, using data from said at least said second portion; and,
   based on said first indicator indicating that said first reading failed and said second indicator indicating that said second reading succeeded, using a bus associated with said second VPD EEPROM.

6. A method of detecting a bus malfunction in a storage system, comprising:
   using a first controller, reading at least a first portion of a first vital product data (VPD) EEPROM;
   using said first controller, reading at least a second portion of a second VPD EEPROM that corresponds to said first portion of said first VPD EEPROM;
   receiving a first indicator of whether said reading said at least said first portion failed;

receiving a second indicator of whether said reading said at least said second portion failed;

using a second controller, reading at least a third portion of said first VPD EEPROM;

using said second controller, reading at least a fourth portion of said second VPD EEPROM that corresponds to said third portion of said first VPD EEPROM;

receiving a third indicator of whether said reading said at least said third portion failed; and, receiving a fourth indicator of whether said reading said at least said fourth portion failed.

7. The method of claim 6, further comprising:

based on said first indicator indicating reading said at least said first portion failed and said third indicator indicating reading said at least said third portion failed, reporting a bus associated with said first VPD EEPROM has failed.

8. The method of claim 6, further comprising:

based on said first indicator indicating reading said at least said first portion failed, said second indicator indicating reading said at least said second portion failed, said third indicator indicating reading said at least said third portion failed, and said fourth indicator indicating reading said at least said third portion failed, initiating a lockdown of said storage system.

9. The method of claim 6, further comprising:

based on said second indicator indicating reading said at least said second portion failed and said fourth indicator indicating reading said at least said fourth portion failed, reporting a bus associated with said second VPD EEPROM has failed.

10. A non-transitory computer readable medium having instructions stored thereon for detecting a product data error in a storage system that, when executed by a computer, at least instruct the computer to:

read at least a first portion of a first vital product data (VPD) EEPROM;

read at least a second portion of a second VPD EEPROM that corresponds to said first portion of said first VPD EEPROM;

receive a first indicator of whether said reading said at least said first portion failed;

receive a second indicator of whether said reading said at least said second portion failed;

compare said at least said first portion and said at least said second portion based on said first indicator and said second indicator;

use data from said at least said first portion based on a result of said comparing indicating a match;

use data from said at least said second portion based on said first indicator indicating an error with said first reading; and, determine, based on said result of said comparing indicating a mismatch, that a first checksum associated with said at least said first portion is correct and determining that a second checksum associated with said at least said second portion is correct.

11. The computer readable medium of claim 10, wherein the computer is further instructed to:

determine, based on determining said first checksum and said second checksum are correct, that a first write counter associated with said first VPD EEPROM indicates said first VPD EEPROM holds more recent data than said second VPD EEPROM.

12. The computer readable medium of claim 11, wherein the computer is further instructed to:

copy, based on determining said first write counter associated with said first VPD EEPROM indicates said first VPD EEPROM holds more recent data than said second VPD EEPROM, said first VPD EEPROM is copied to said second VPD EEPROM.

13. A non-transitory computer readable medium having instructions stored thereon for detecting a product data error in a storage system that, when executed by a computer, at least instruct the computer to:

read at least a first portion of a first vital product data (VPD) EEPROM;

read at least a second portion of a second VPD EEPROM that corresponds to said first portion of said first VPD EEPROM;

receive a first indicator of whether said reading said at least said first portion failed;

receive a second indicator of whether said reading said at least said second portion failed;

compare said at least said first portion and said at least said second portion based on said first indicator and said second indicator;

use data from said at least said first portion based on a result of said comparing indicating a match;

use data from said at least said second portion based on said first indicator indicating an error with said first reading; and, initiate, based on said first indicator indicating that said first reading failed and said second indicator indicating that said second reading failed, a lockdown of said storage system.

14. A non-transitory computer readable medium having instructions stored thereon for detecting a product data error in a storage system that, when executed by a computer, at least instruct the computer to:

read at least a first portion of a first vital product data (VPD) EEPROM;

read at least a second portion of a second VPD EEPROM that corresponds to said first portion of said first VPD EEPROM;

receive a first indicator of whether said reading said at least said first portion failed;

receive a second indicator of whether said reading said at least said second portion failed;

compare said at least said first portion and said at least said second portion based on said first indicator and said second indicator;

use data from said at least said first portion based on a result of said comparing indicating a match;

use data from said at least said second portion based on said first indicator indicating an error with said first reading; and, use, based on said first indicator indicating that said first reading failed and said second indicator indicating that said second reading succeeded, a bus associated with said first VPD EEPROM is marked to be failed.

* * * * *